(12) United States Patent
Wang et al.

(10) Patent No.: US 8,150,212 B2
(45) Date of Patent: Apr. 3, 2012

(54) SYSTEM AND METHOD FOR AUTOMATIC DIGITAL IMAGE ORIENTATION DETECTION

(75) Inventors: Dong Wang, Beijing (CN); Matthew L. Cooper, San Francisco, CA (US)

(73) Assignee: Fuji Xerox Co., Ltd, Tokyo (JP)

( * ) Notice: Subject to any disclaimer, the term of this patent is extended or adjusted under 35 U.S.C. 154(b) by 1028 days.

(21) Appl. No.: 12/101,119

(22) Filed: Apr. 10, 2008

(65) Prior Publication Data

US 2009/0257682 A1      Oct. 15, 2009

(51) Int. Cl.
*G06K 9/36* (2006.01)
(52) U.S. Cl. ...................................... 382/289
(58) Field of Classification Search .............. 382/289, 382/224–226, 115–118, 305, 159–160, 103, 382/190, 128–132
See application file for complete search history.

(56) References Cited

U.S. PATENT DOCUMENTS

| 7,215,828 B2* | 5/2007 | Luo ................. | 382/289 |
| 7,519,200 B2* | 4/2009 | Gokturk et al. ................. | 382/118 |
| 2010/0054533 A1* | 3/2010 | Steinberg et al. ............. | 382/103 |

OTHER PUBLICATIONS

Baluja, Shumeet, "Large Scale Performance Measurement of Content-Based Automated Image-Orientation Detection" Publication Date: Sep. 11-14, 2005 vol. 2, on pp. II-514-17.
Tolstaya, Ekaterina, "Content-based Image Orientation Recognition" Image Enhancement Technology Group, Printing Technology Lab, Samsung Research Center, http://www.graphicon.ru/2007/proceedings/Papers/Paper_48.pdf.
Wang, Michelle, "Detecting Image Orientation Based on Low-Level Visual Content" Image Computer Vision and Image Understanding 93 (200) 328-346.
Wang, Lei, Image Orientation Detection with Integrated Human Perception Cues (Or Which Way is Up) Image Processing, 2003. ICIP 2003. Proceedings. 2003 International Conference on vol. 2, Issue , Sep. 14-17, 2003 pp. II-539-42 vol. 3.
Luo, Jiebo "Automatic Image Orientation Detection via Confidence-Based Integration of Low-Level and Semantic Cues", IEEE Transaction on Patter Analysis and Machine Intelligence, vol. 27m Bi, 5, May 2005.
Zhang, Lei, "Boosting Image Orientation Detection with Indoor vs. Outdoor Classification"*Sixth IEEE Workshop on Applications of Computer Vision (WACV'02)* p. 95.
Liu, Ting, "Clustering Billions of Images with Large Scale nearest Neighbor Search" IEEE Workshop on Application of Computer Vision (WACV'07).
Vailaya, Aditya, "Automatic Image Orientation Detection" IEEE Transactions on Image Processing, vol. 11, No. 7 Jul. 2002.

* cited by examiner

*Primary Examiner* — Ishrat I Sherali
(74) *Attorney, Agent, or Firm* — Sughrue Mion, PLLC

(57) ABSTRACT

Described is a system for automatic digital photo orientation detection. We leverage online public photos with great content variation to extract effective features with layout information. Classification proceeds using an approximate nearest neighbors approach which scales well to massive training sets, hardly compromising efficiency. We have tested the method successfully on the largest data set to date of nearly 30,000 Flickr photos as well as both difficult and typical consumer usage scenarios. Though limited data are available for comparison across different systems, the proposed system significantly outperforms a state of the art system on a common data set.

22 Claims, 5 Drawing Sheets

| features | cm6 7x7 | eh17 5x5 | cm6 7x7 | eh17 5x5 | cm6 + eh17 |
|---|---|---|---|---|---|
| # of classes | 4 | 4 | 3 | 3 | 3 |
| # trees | 6 | 17 | 6 | 17 | 23 |
| node dim. | 49 | 25 | 49 | 25 | 49 (cm) 25 (eh) |
| run | 10 | 10 | 10 | 10 | 10 |
| m | 400 | 400 | 400 | 400 | 300 |
| time (sec.) | 0.00167 | 0.00419 | 0.00167 | 0.00419 | 0.004612 |
| total acc. | 0.792066 | 0.895127 | 0.81384 | 0.9169 | 0.953015 |
| landscape acc. | 0.790367 | 0.903761 | 0.813194 | 0.9244 | 0.956251 |
| portrait acc. | 0.797564 | 0.867198 | 0.81591 | 0.89262 | 0.942548 |

FIGURE 2

| # of classes | 3 | 3 w/ rejection | 3 w/ rejection |
|---|---|---|---|
| total acc. | 0.953015 | 0.963525 | 0.973092 |
| rejection rate | - | 0.022445 | 0.047091 |

FIGURE 3

| Data Set | # photos | total acc. | rejection rate |
|---|---|---|---|
| Test Set 1 | 1861 | 0.991704 | 0.0284793 |
| Test Set 2 | 1167 | 0.976765 | 0.041131 |
| UW | 1109 | 0.995459 | 0.004284 |

FIGURE 4

| tags | # photos | total acc. | rejection rate |
|---|---|---|---|
| bird | 1999 | 96.00 | 6.40 |
| plant | 1999 | 95.29 | 8.70 |
| animals | 1999 | 97.94 | 5.25 |
| butterfly | 1999 | 95.62 | 8.60 |
| flower | 1999 | 95.31 | 8.20 |
| cameraphone | 1583 | 96.81 | 7.01 |

| | | with rejection | | | | without rejection | |
|---|---|---|---|---|---|---|---|
| | | our method | | [2] | | our method | [2] |
| tags | # photos | total acc. | rej. rate | total acc. | rej. rate | total acc. | total acc. |
| springflowers | 48 | 100.00 | 0.00 | 73 | 37.5 | 100 | 64.5 |
| arbor | 47 | 100.00 | 0.00 | 87.1 | 17 | 100 | 76.7 |
| barcelona | 48 | 90.91 | 8.33 | 100 | 25 | 85.4 | 85.4 |
| cherries | 55 | 100.00 | 0.00 | 100 | 20 | 100 | 90.1 |
| football | 48 | 100.00 | 8.33 | 92.5 | 16.6 | 95.8 | 89.5 |
| greenland | 255 | 97.62 | 1.18 | 100 | 17.6 | 97.3 | 92.9 |
| yellowstone | 48 | 100.00 | 0.00 | 97.7 | 37.5 | 100 | 89.6 |

| # training photos | total acc. | time (sec.) |
|---|---|---|
| 5000 | 0.963998 | 0.0037 |
| 25000 | 0.98227 | 0.00586 |

SYSTEM AND METHOD FOR AUTOMATIC DIGITAL IMAGE ORIENTATION DETECTION

DESCRIPTION OF THE INVENTION

1. Field of the Invention

This invention generally relates to digital image analysis and more specifically to automatic digital image orientation detection.

2. Description of the Related Art

Substantial current multimedia analysis research focuses on information retrieval of digital content. However, the huge body of content-based image processing and understanding techniques are based on the assumption that the input images are correctly oriented. Though mechanical sensors can produce meta data indicative of the correct orientation when the image is produced, the lower-end digital cameras, cell-phone cameras and scanned images still require for the user to manually provide the correct orientation. As an indispensable component of photo management tasks, this orientation assignment will surely benefit from automation.

There is a significant body of related work in image orientation classification. This work can be roughly grouped into methods that use only low-level features or those that additionally incorporate high-level semantics. Much of the most recent work has argued that further improvements in this problem will require deeper semantic image analysis at the level of object recognition. Many others adopt the low-level feature based only approach.

Among the first few explorations, work described in Aditya Vailaya, HongJiang Zhang, Changjiang Yang, Feng-I Liu, and Anil K. Jain, Automatic image orientation detection. IEEE Transactions on Image Processing, 11(7):746-755, 2002, compared a number of standard classification methods for image orientation classification, including SVMs and nearest neighbors. The authors of the above work used the Corel image dataset and presented a Bayesian approach to incorporate priors for the orientation classes. Dimension reduction using minimum description length selects the subspace dimensionality. The method that the authors felt provides the best combined efficiency and performance used a learning vector quantizer (LVQ), described in Teuvo Kohonen, Jussi Hynninen, Jari Kangas, Jorma Laaksonen, and Kari Torkkola., Lvq pak: A program package for the correct application of learning vector quantization algorithms, In Intl. Joint Conf. on Neural Networks, pages I 725-730, New York, 1992, ACM, with reduced dimension features based on linear discriminant analysis (LDA). The authors did not favor the NN method due to its computational complexity. The authors also did not report using any approximate nearest neighbor methods or data structures for accelerated classification.

Work by Ekaterina Tolstaya, Content-based image orientation recognition, In Graphicon 2007, presented a technique based on novel texture features and boosting which showed good performance on an unspecified data set. Work described in Yongmei Wang and Hongjiang Zhang, Detecting image orientation based on low-level visual content, Computer Vision and Image Understanding (CVIU), 93(3):328-346, 2004, used low level features in combination with SVMs and reported results similar to those of Jiebo Luo and Matthew Boutell, Automatic image orientation detection via confidence-based integration of low-level and semantic cues. IEEE Transactions on Pattern Analysis and Machine Intelligence, 27(5):715-726, May 2005 on the Corel data set. They also report better performance using the SVMs compared to the LVQ of Aditya Vailaya, HongJiang Zhang, Changjiang Yang, Feng-I Liu, and Anil K. Jain, Automatic image orientation detection, IEEE Transactions on Image Processing, 11(7):746-755, 2002.

Work by Shumeet Baluja and Henry A. Rowley, Large scale performance measurement of content-based automated image-orientation detection, In Proc. IEEE International Conference on Image Processing ICIP 2005, volume 2, pages II-514-17, 2005, presented results for experiments with a large collection of web distributed images. The authors also compared a variety of features using SVMs for classification. The work reported substantially lower performance on Internet imagery in comparison to the Corel images, and again lower performance on Corel compared to the aforesaid work by Vailaya et al. The authors also analyzed performance variations with image category.

The work by Jiebo Luo and Matthew Boutell, Automatic image orientation detection via confidence-based integration of low-level and semantic cues, IEEE Transactions on Pattern Analysis and Machine Intelligence, 27(5):715-726, May 2005, is notable for pushing forward the semantic based approach. The authors used a Bayesian framework, which incorporated quite a few useful semantic concept detectors, ranging from detectors for faces, blue sky, cloudy sky, grass and ceiling wall. However, given the substantial variability of consumer photos, the limited detectors still will not scale well. Yet these detectors takes quite a lot time to perform, as we expected. The authors used Corel images and some consumer photos for testing and report substantially lower performance than Vailaya, et al. in both the Corel and consumer testing (the authors were unable to reproduce the results of Vailaya et al.). Combining the semantic detectors and SVMs based on low level features in a Bayesian network, the authors reported almost 90% accuracy on a combined Corel and consumer test set. The use of the Bayesian network in this work seemed to show very slightly better performance than the SVM on the Corel data. While the system employs a powerful machine-learning scheme, it is not clear that the system could scale to leverage massive training sets. In this line of research, Lei Wang, Xu Liu, Lirong Xia, Guangyou Xu, and Alfred M. Bruckstein. Image orientation detection with integrated human perception cues (or which way is up), In ICIP (2), pages 539-542, 2003, used a Bayesian framework to integrate to combine carefully selected orientation cues including face orientations, sky position, textured objects and symmetry. The authors tested their methodology on personal photos, which are known to include proportionally more faces than generic images, and reported results of around 90% accuracy. A work by Lei Zhang, Mingjing Li, and Hong-Jiang Zhang, Boosting image orientation detection with indoor vs. outdoor classification, In WACV '02: Proceedings of the Sixth IEEE Workshop on Applications of Computer Vision, page 95, Washington, D.C., USA, 2002, IEEE Computer Society, presents an approach combining boosting and indoor-outdoor classification. The authors also report experiments with SVMs and training sets of about 5000 images. The authors tested their algorithm on the Corel data reporting excellent results with high levels of rejection, and the results are essentially comparable to the results of Luo et al. and Wang et al. above.

However, despite the above successes, the conventional technology fails to enable scalable and effective automated detection of the correct image orientation.

SUMMARY OF THE INVENTION

The inventive methodology is directed to methods and systems that substantially obviate one or more of the above and other problems associated with conventional techniques for image orientation detection.

In accordance with one aspect of the inventive concept, there is provided a computerized method for determining an optimal image orientation. The inventive method involves: obtaining an input image; extracting image features for the input image; generating rotated image features corresponding to alternate orientation of the image; analyzing the extracted and generated features using a plurality search trees constructed from large sets of images of known orientation, the plurality of search trees comprising candidate nearest neighbors; combining orientations of the candidate nearest neighbors using a weighted vote; and determining the optimal image orientation of the input image using a result of the previous combining step.

In accordance with another aspect of the inventive concept, there is provided a computer readable medium embodying a set of instructions, the set of instructions, when executed by one or more processors, is operable to cause the one or more processors to perform a method for determining an optimal image orientation. The inventive method involves: obtaining an input image; extracting image features for the input image; generating rotated image features corresponding to alternate orientation of the image; analyzing the extracted and generated features using a plurality search trees constructed from large sets of images of known orientation, the plurality of search trees comprising candidate nearest neighbors; combining orientations of the candidate nearest neighbors using a weighted vote; and determining the optimal image orientation of the input image using a result of the previous combining step.

In accordance with yet another aspect of the inventive concept, there is provided a system for determining an optimal image orientation. The inventive system includes: an input module operable to obtain an input image; an image feature extracting module operable to extract image features for the input image; a rotated image features generation module operable to generate rotated image features corresponding to alternate orientation of the image; a search tree module operable to analyze the extracted and generated features using a plurality search trees constructed from large sets of images of known orientation, the plurality of search trees comprising candidate nearest neighbors; and a combining module operable to combine orientations of the candidate nearest neighbors using a weighted vote; wherein the optimal image orientation of the input image is determined based on a result of the combining.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 2 illustrates good performance of an embodiment of the inventive technique for orientation classification on a generic large scale consumer dataset.

FIG. 3 illustrates the results incorporating rejection.

FIG. 4 illustrated classification results for test sets using Flickr training data.

FIG. 5 illustrates classification results for these tag test sets.

FIG. 6 illustrates results of the comparison of an embodiment of the inventive system with a state of the art system FIG. 7 illustrates results corresponding to 1861-image personal photo collection test set.

DETAILED DESCRIPTION

In the following detailed description, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

Figure 1:
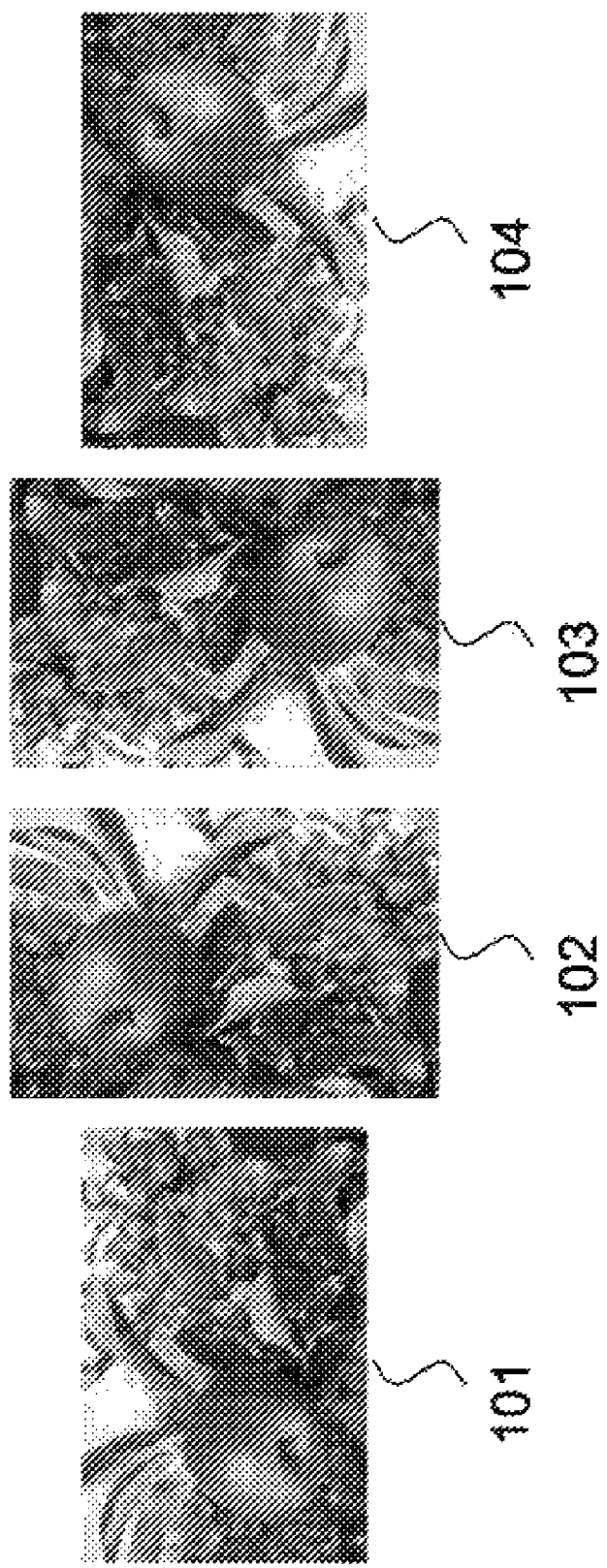
FIG. 1 illustrates an exemplary orientation detection problem.

FIG. 1 illustrates an exemplary orientation detection problem. The correct orientation is the leftmost image 101.

As known to persons of skill in the art, somewhat disparate learning techniques including SVMs, Bayesian networks, and boosting are performing at approximately the same level on the Corel data. Though many people had argued that the Corel data set is too simple, people continuously use it for various tasks. In contrast, we believe a more data-intensive approach is needed. Embodiments of the inventive method are based on the use of neighborhood-based non-parametric classification and large generic training (and testing) sets. The approach does not make limiting assumptions regarding the content or the availability of any metadata, nor does it rely on specialized semantic classifiers.

An embodiment of the inventive technique provides a high performance image orientation classification scheme that uses approximation methods and efficient data structures to scale nearest neighbor classification to higher dimensional features and massive training sets without compromising efficiency. The method uses kd-trees to index features based on either spatial blocks, feature dimension, or some combination or projection of the two. The individual trees are used to produce candidate nearest neighbors for classification by a weighted vote. As noted above, the inventive method is based on the assumption that this problem requires classification methods with minimal prior assumptions and large generic training sets. Such training data is now commonly available on the internet. It is believed that further improvements can result from the use of still larger training sets than those we use here, without noticeably impacting computational efficiency. Various embodiments of the inventive approach are designed to exploit these newly available and rapidly growing distributed data collections.

In accordance with an embodiment of the inventive methodology, there is provided a scalable approach to orientation detection. An embodiment of the invention relies on abundant human information from the web for model training purposes. Every learning method has two components: the data and the model. Past explorations in Natural Language Processing and Computer Graphics, described in detail in James Hays and Alexei A Efros, Scene completion using millions of photographs, ACM Transactions on Graphics (SIGGRAPH 2007), 26(3), 2007, have vividly shown that given enough data, a simple model can do as well as more complex models. Thus motivated, an embodiment of the invention leverages on large-scale training data available to everyone, extracts improved standard features and uses lazy nearest neighborhood (NN) based indices into the low-level representations of the training data. The central challenge of this problem is that various photo categories present very different challenges for orientation classification. These variations are carefully detailed in Shumeet Baluja and Henry A. Rowley, Large scale performance measurement of content-based automated image-orientation detection, In Proc, IEEE International Conference on Image Processing ICIP 2005, volume 2, pages II-514-17, 2005, where common test sets for previous work on this problem are deemed unrealistic, often comprised disproportionately of landscape images including the sky or other strong orientation cues. In the recent treatments of this problem, two kinds of approaches are clearly visible. The simpler one uses only low-level features, while the complex one assumes that some explicit semantic knowledge is vital to understand the image orientation. Pursuant to embodiments of the inventive concept, it can be convincingly shown that given enough data with the implicit semantic statistics embedded, low level features, when handled properly, can perform at a high level alone without the aid of semantic classifiers such as "face detection" or "indoor/outdoor" present. It should be noted that this is because the nearest neighbor approach performs very well when sufficient training data is available. As the results show, the most difficult image orientation tasks such as "flower", "bird", "cameraphone", can be solved by the embodiments of the inventive method with over 95% detection accuracy.

As well known to persons of skill in the art, the main disadvantage of nearest neighbors is the computational complexity of naive implementations. However, this has not been found to be a limitation of at least some embodiments of the present invention because they use an approximate nearest neighbor (ANN) implementation, which usually returns the result in several milliseconds, given the extracted image features. Sophisticated data structures and distributed implementations for approximate nearest neighbor search have enabled their use for processing much larger data sets than those that are considered here, as described in Ting Liu, Chuck Rosenberg, and Henry Rowley. Clustering Billions of Images with Large Scale Nearest Neighbor Search. Proc. IEEE Workshop on Applications of Computer Vision, 2007.

At the same time, the computational complexity is a critical consideration for deployment of these methods in the consumer domain. Thus, the average execution time for classification over large training and test sets is reported herein.

Technical Details

Below, various embodiments of the invention for use with digital photos are described. As would be appreciated by persons of skill in the art, various described features of an embodiment of the inventive concept, especially the edge histogram feature, are quite strong compared with past algorithms for image orientation detection. However, other choices for low level features and distance functions are possible and may be more appropriate to specific contexts.

Feature Extraction

In accordance with an embodiment of the inventive technique, edge orientation histograms are extracted from each block in a uniform 5×5 spatial grid, irrespective of the image orientation. The uniform 5×5 block makes it suitable for both landscape and portrait images. Then in each grid, after obtaining the Canny filter responses, the edges are quantized into 16 equally split bins of the direction to form a histogram. The magnitude of the edge of each pixel is counted as the weight for the bin within the corresponding orientation range. Besides, one extra bin is used for edge magnitudes below a threshold, or equivalently, to collect the smooth points. This bin will dominate the histogram for blocks without significant detectable edges. Thus, each block has 17 dim and the resulting dimensionality for the feature is 25×17=425.

Color moment features, commonly used in orientation classification systems, have also been computed. For this feature, the image is transformed to the LUV color space and a finer 7×7 spatial grid is used, because the color features are low dimensional descriptors. In each block, the first and second moment for each LUV channel are calculated and stored with resulting dimensionality 49×6=294.

In accordance with an embodiment of the inventive technique, the features are normalized in a per-dimension min-max style. For dimension i with $f^m_i$ and $f^M_i$ of minimum and maximum of that dimension, each feature value $f_i$ is normalized to $f_i = f_i - f^m_i / f^M_i - f^m_i$ where $f_i$ is the normalized feature for further process.

Classification Scheme

Because an embodiment of the invention aims at discriminating all four orientations, in an embodiment of the invention, a four class classification scheme is being adopted. Given the input image, an embodiment of the inventive system tries to determine whether the image needs to be rotated left, rotated right, flipped or left unchanged. This classification scheme is equivalent to extracting the image feature for each possible orientation. The rotated versions of the feature, corresponding to the rotated images, can be obtained by block permutation plus an edge orientation rotation for the edge feature. In turn, this increases the available training set and further necessitates the use of efficient classification methods.

Nearest Neighbor Analysis

Given the huge number of training examples in the experiments, it is unrealistic to train a Support Vector Machine (SVM) classifier using the full data set due to the required $O(N^2)$ or even $O(N^3)$ training time. Meanwhile, because the support vectors are in proportion to the data size, test time can be quite long, as discussed in Shumeet Baluja, Automated image-orientation detection: a scalable boosting approach, Pattern Anal. Appl., 10(3):247-263, 2007. In contrast, the NN approach, when equipped with approximation, is much more efficient and can handle large-scale data sets well.

Feature-Based Subspaces

In accordance with an embodiment of the invention, given low-level features, a series of search trees are constructed using approximate nearest neighbors (ANN) and the software package described in David M. Mount and Sunil Arya, Ann: A library for approximate nearest neighbor searching, version 1.1.1, available from the University of Maryland department of computer science.

Since kd-trees described in Andrew Moore: A tutorial on kd-trees, Extract from PhD Thesis, 1991, available from Carnegie Mellon University, cannot scale well when the feature dimension goes beyond 30-dim dimensionality, see Ting Liu, Henry Rowley, and Chuck Rosenberg. Clustering Billions of Images with Large Scale Nearest Neighbor Search. Proc. IEEE Workshop on Application of Computer Vision, 2007, one decomposition step is being added before that to split the features into groups of subspaces with no more than 30 dimensions per kd-tree. Specifically, the measurements are grouped for each of the 17 edge histogram bins across the spatial blocks. That is, the block edge histograms are re-indexed into 17 25-dimensional vectors. Then, 17 kd-trees are computed from these training features.

In accordance with an embodiment of the invention, classification proceeds as follows. Given a test image, the ten nearest neighbors from each of the 17 trees are identified using a partial sort procedure. This step produces 170 training samples, from which the ten closest to the test sample are determined by re-calculating the full distances. These ten samples are used to vote on the class of the test sample using a distance-weighted score. Denote the ten training samples $\{t_j: i=1, \ldots, 10\}$ and the query image q. It is assumed for simplicity that the ten samples are sorted according to their distance from q such that $t_1$ is the training sample closest to q. The distance from the $i^{th}$ furthest of the ten samples is defined as $d(t_1, q)$. Then the score for each class c, is $$f(c) = \sum_{i=1}^{9} \left( \frac{d(t_{10}, q) - d(t_i, q)}{d(t_{10}, q) - d(t_1, q)} \right) \delta(l_i - c)$$

where $l_i$ is the label of training sample $t_1$ and $\delta(l_i-c)$ is the delta function which is one only when $l_i=c$ and zero otherwise. The predicted class is determined by a simple maximization of the above score, equivalent to a (weighted) majority vote:

$$c^* = \underset{c}{\mathrm{argmax}}\, f(c)$$

The feature vectors are indexed in the kd-trees independently according to the histogram bins because kd-tree performance does not scale well with feature. However, the performance of such approximate nearest neighbor schemes is often close to that of exact methods with significantly reduced computation.

To further accelerate classification, the nearest neighbor-search is truncated in each tree using a priority queue. Generally, using kd-trees does not require extensive checking of training points in the tree. The tree's structure is designed to significantly limit training points for which distances need to be computed. A parameter m is set such that it limits the number of points that are evaluated to either 300 or 400 for each image in the experiments. More details can be found in Sunil Arya, David M. Mount, Nathan S. Netanyahu, Ruth Silverman, and Angela Y. Wu, An optimal algorithm for approximate nearest neighbor searching fixed dimensions, J. ACM, 45(6):891-923, 1998 and David M. Mount and Sunil Arya. Ann: A library for approximate nearest neighbor searching, version 1.1.1, available from the University of Maryland department of computer science.

Protection-Based Subspaces

There are several alternative embodiments of the above scheme that are of interest. The feature-based projection scheme is one specific example of the more general random projection based subspaces, as described in Dmitriy Fradkin and David Madigan, Experiments with random projections for machine learning, In KDD '03: Proceedings of the ninth ACM SIGKDD international conference on Knowledge discovery and data mining, pages 517-522, New York, N.Y., USA, 2003, ACM. In one embodiment, the general random projection is implemented and compared with the feature-based projection.

Evaluation

Embodiments of the inventive approach have been evaluated using a large-scale dataset assembled from the popular photo sharing site Flickr. 56,315 photos have been downloaded and at least one among a popular set of tags has been selected for processing. The photos are all from a ten month period in 2007. The photos were randomly split in to approximately equal training and test sets, 28,157 for training and 28,158 for testing. The experiments will be described using this data below. Also, three other smaller test data sets of available photo collections have been collected. Test Sets 1 and 2 are both personal photo collections spanning several years. The "UW" collection is not a personal photo collection, but a set of photographs used for benchmarking object recognition experiments. To avoid a bias towards the most common images with the popular tags, six slightly overlapping categories of photos from Flickr have been additionally extracted, which are considered as difficult by previous approaches described in Jiebo Luo and Matthew Boutell, Automatic image orientation detection via confidence-based integration of low-level and semantic cues, IEEE Transactions on Pattern Analysis and Machine Intelligence, 27(5):715-726, May 2005 and Shumeet Baluja, Automated image-orientation detection: a scalable boosting approach, Pattern Anal, Appl., 10(3):247-263, 2007, namely "bird", "plant", "animals", "butterfly", "flower" and "cameraphone". Each category consists 2000 photos, except cameraphone is 1583 due to the limited data available. All results were obtained using a Intel Core Duo 2.4 GHz machine with 2 GB of RAM. While current implementation of an embodiment of the invention does not employ multi-threading, the approach is clearly amenable to parallelization for both the construction and searching of kd-trees.

Pragmatically speaking, when the system is used in real world, it is likely that the images are produced by a digital camera. For this usage case, the user may rotate the camera very often, while rotating it is far less so for the landscape images. Thus, only a single landscape orientation is considered to improve efficiency and usually accuracy as well. Inventors have also considered a simple rejection scheme when the system can not confidently determine the orientation. Rejection is incorporated by thresholding the classification scores ratios of the maximum and then second maximum by a given value. Thus the photos for which the classifier is not confident are retained for manual inspection.

Since the past systems all based their work on the Corel data set which was not available, the comparison was made with the comprehensive work of Baluja on the 7 subset of the UW set. However, it was determined that the performance of an embodiment of the inventive system is superior to that of Baluja.

Results on Flickr Test Set

The results in Table 200 shown in FIG. 2 show very good performance for orientation classification on a generic large scale consumer dataset. Using the modified nearest neighbor search above, the per image classification times under 5 milliseconds for each method are reported, despite the use of a very large training set. Low-level feature fusion, three class classification, and outlier rejection all produce further performance improvements. The number of trees is based on the low-level feature dimensionality. The node dimensionality is the total number of spatial blocks in which features are calculated. This is the dimensionality of the feature vectors in each tree. The row "m" is the number of approximate nearest neighbors used for classification. The row "m" is the parameter governing the number of points searched for determining the approximate nearest neighbors before the search is truncated. The Table 200 also shows total accuracy, and separate recognition rates for portrait and landscape photos. The results incorporating rejection appear in Table 300 shown in FIG. 3. The rejection rates are quite low, further suggesting that the method would require little manual correction on the part of users in practice.

Results on Other Test Sets

In a second experiment, the trees designed above using the downloaded training data from Flickr were used to classify orientation of several smaller available photo collections. The three data sets are introduced above. Classification results for these test sets using the same Flickr training data appear in Table 400 shown in FIG. 4. The problem is somewhat easier in the consumer domain where smooth or textured patterns or other content with higher degrees of circular symmetry is less common. However, these results demonstrate that the use of large generic training sets for this problem is very effective.

The test sets of images with different tags try to answer the possible question of over-focus on more broad domain and overlooked some difficult ones. As pointed out in Baluja above, images associated with the tags are quite difficult since images of dogs only 75% correct, birds ranging from 60% to 78% and flowers and butterfly can fall as low as 46% and 54%, all in a three orientation task. Meanwhile, the cameraphone captured photos are potential application in the near future. Thus, they have been singled out here. The reported accuracy of cameraphone taken images are 71% in Baluja. Classification results for these tag test sets are presented in Table 500 shown in FIG. 5.

As the result shows, the used embodiment of the inventive system obtains very good performance on these difficult tags. It seems clear that embodiments of the inventive system adapts well to these less attended and difficult categories. Note that the classifier does not need to be adapted to each test collection in any way.

Comparison with a State of the Art System

Due to the limited data available, it was only possible to compare an embodiment of the inventive system with the system described in Baluja, cited above, with ~550 photos from the UW set since Baluja kindly provides detailed results for 8 categories of the UW data in Table 2 of Baluja. However, the Barcelona2 subset was not available on the web site, thus the comparison was made only with the remaining 7 subsets. The results are shown in Table 600 presented in FIG. 6, where again the result is shown for the 3 orientation task, with rejection and 4 orientations without rejection.

The run time of an embodiment of the inventive method is also among the fastest of published systems. While Luo takes 6 seconds for one single photo, excluding feature extraction, and work by Shumeet Baluja and Henry A. Rowley, Large scale performance measurement of content-based automated image-orientation detection, In Proc. IEEE International Conference on Image Processing ICIP 2005, volume 2, pages II-514-17, 2005, takes SVM with 3930 features which should be slow, the embodiment of the inventive system takes only 4 milliseconds for execution, also excluding feature extraction. While it is desirable to make a comparison with Baluja, however no run time information is provided there. It is possible that those experiments were conducted in a large-scale distributed computing environment in contrast to the single PC that has been used.

Effect of Additional Data

The inventors finally did an experiment using the 1861-image personal photo collection Test Set 1 to assess performance using a smaller training set. The results appear in Table 700 shown in FIG. 7. Using only 5000 photos from the Flickr set for training degrades accuracy with a 36% reduction in average classification time per image. It is believed that additional performance improvements are possible with larger training sets, without noticeable increases in complexity.

Exemplary Operating Sequence

Figure 8:
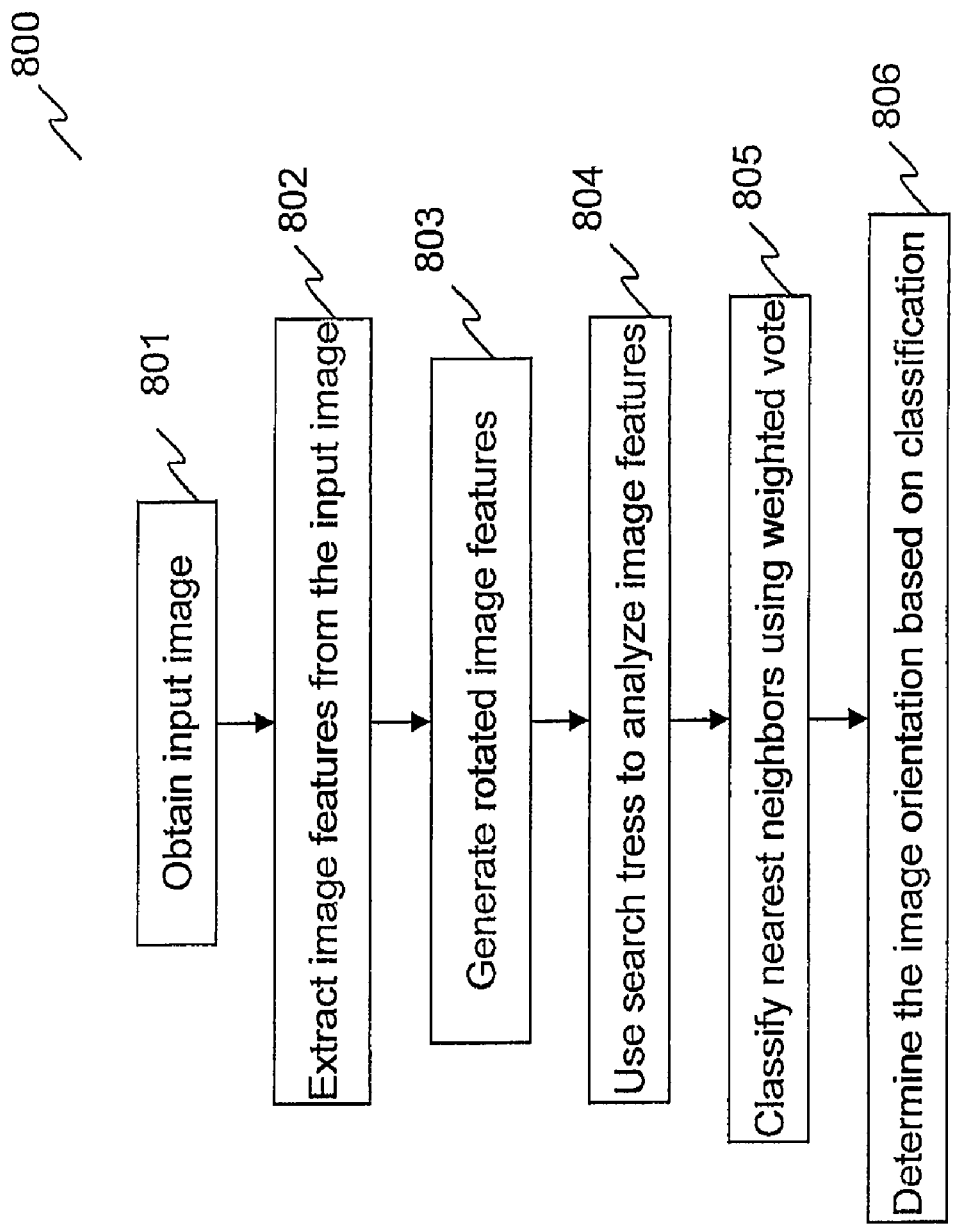
FIG. 8 illustrates an exemplary operating sequence of an embodiment of the inventive technique.

FIG. 8 illustrates an exemplary operating sequence 800 of an embodiment of the inventive technique. At step 801, an input image is obtained. At step 802, the system extracts image features (edge orientation histograms) for the input image. At step 803, the system generates image features corresponding to alternate orientation of the image (rotated image). At step 804, the system uses multiple search trees implementing the approximate nearest neighbor technique to analyze the extracted and generated features. At step 805, the system classifies the candidate nearest neighbors using a weighted vote. At step 806, the system determines the optimal image orientation of the input image based on the result of the classification.

In another embodiment of the invention, instead of generating the features corresponding to the rotated image, the equivalent features are extracted from the image that has actually been rotated.

Exemplary Computer Platform

Figure 9:
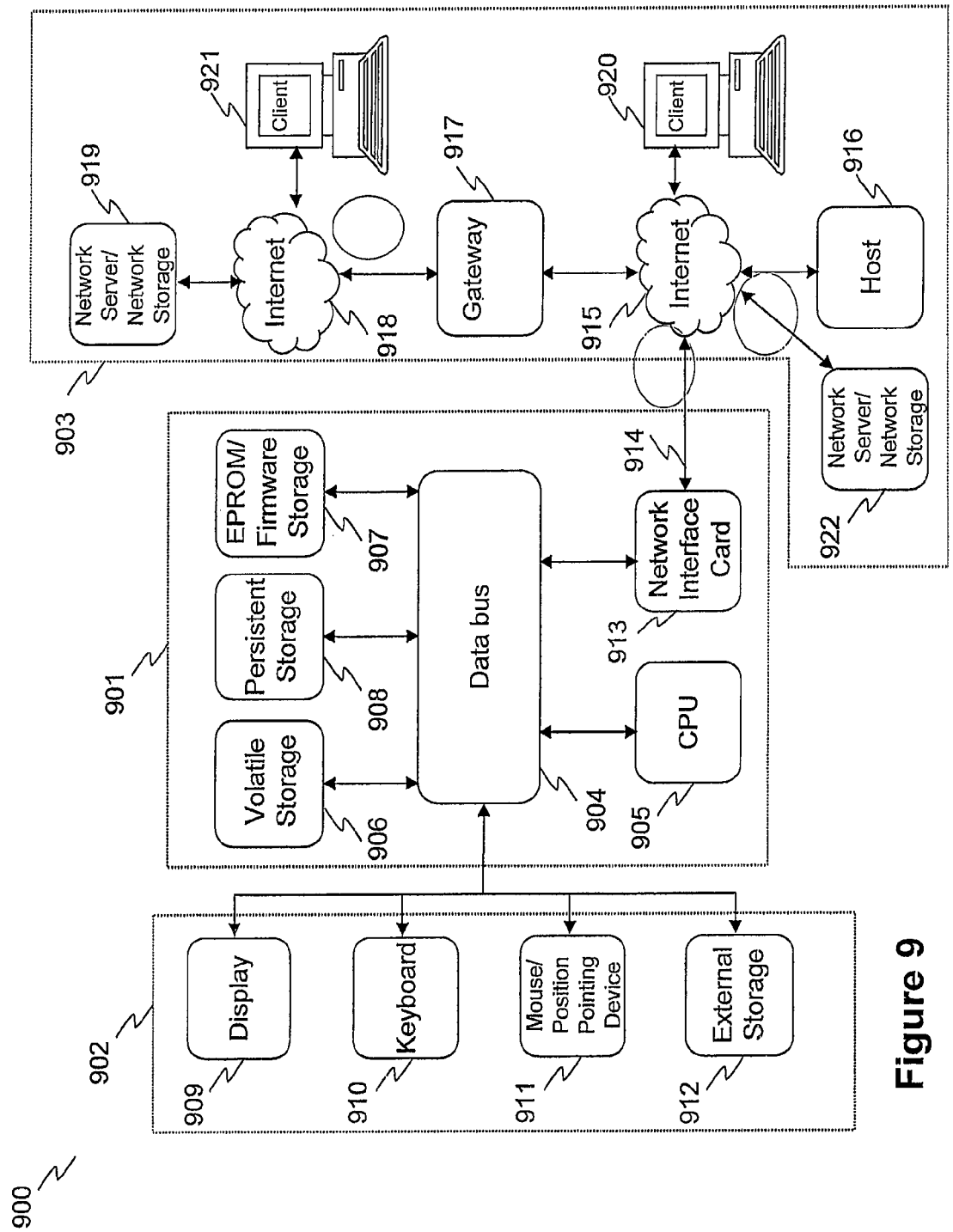
FIG. 9 illustrates an exemplary embodiment of a computer platform upon which the inventive system may be implemented.

FIG. 9 is a block diagram that illustrates an embodiment of a computer/server system 900 upon which an embodiment of the inventive methodology may be implemented. The system 900 includes a computer/server platform 901, peripheral devices 902 and network resources 903.

The computer platform 901 may include a data bus 904 or other communication mechanism for communicating information across and among various parts of the computer platform 901, and a processor 905 coupled with bus 901 for processing information and performing other computational and control tasks. Computer platform 901 also includes a volatile storage 906, such as a random access memory (RAM) or other dynamic storage device, coupled to bus 904 for storing various information as well as instructions to be executed by processor 905. The volatile storage 906 also may be used for storing temporary variables or other intermediate information during execution of instructions by processor 905. Computer platform 901 may further include a read only memory (ROM or EPROM) 907 or other static storage device coupled to bus 904 for storing static information and instructions for processor 905, such as basic input-output system (BIOS), as well as various system configuration parameters. A persistent storage device 908, such as a magnetic disk, optical disk, or solid-state flash memory device is provided and coupled to bus 901 for storing information and instructions.

Computer platform 901 may be coupled via bus 904 to a display 909, such as a cathode ray tube (CRT), plasma display, or a liquid crystal display (LCD), for displaying information to a system administrator or user of the computer platform 901. An input device 910, including alphanumeric and other keys, is coupled to bus 901 for communicating information and command selections to processor 905. Another type of user input device is cursor control device 911, such as a mouse, a trackball, or cursor direction keys for communicating direction information and command selections to processor 904 and for controlling cursor movement on display 909. This input device typically has two degrees of freedom in two axes, a first axis (e.g., x) and a second axis (e.g., y), that allows the device to specify positions in a plane.

An external storage device 912 may be connected to the computer platform 901 via bus 904 to provide an extra or removable storage capacity for the computer platform 901. In an embodiment of the computer system 900, the external removable storage device 912 may be used to facilitate exchange of data with other computer systems.

The invention is related to the use of computer system 900 for implementing the techniques described herein. In an embodiment, the inventive system may reside on a machine such as computer platform 901. According to one embodiment of the invention, the techniques described herein are performed by computer system 900 in response to processor 905 executing one or more sequences of one or more instructions contained in the volatile memory 906. Such instructions may be read into volatile memory 906 from another computer-readable medium, such as persistent storage device 908. Execution of the sequences of instructions contained in the volatile memory 906 causes processor 905 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 905 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 908. Volatile media includes dynamic memory, such as volatile storage 906. Transmission media includes coaxial cables, copper wire and fiber optics, including the wires that comprise data bus 904. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 905 for execution. For example, the instructions may initially be carried on a magnetic disk from a remote computer. Alternatively, a remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on the data bus 904. The bus 904 carries the data to the volatile storage 906, from which processor 905 retrieves and executes the instructions. The instructions received by the volatile memory 906 may optionally be stored on persistent storage device 908 either before or after execution by processor 905. The instructions may also be downloaded into the computer platform 901 via Internet using a variety of network data communication protocols well known in the art.

The computer platform 901 also includes a communication interface, such as network interface card 913 coupled to the data bus 904. Communication interface 913 provides a two-way data communication coupling to a network link 914 that is connected to a local network 915. For example, communication interface 913 may be an integrated services digital network (ISDN) card or a modem to provide a data communication connection to a corresponding type of telephone line. As another example, communication interface 913 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 913 sends and receives electrical, electromagnetic or optical signals that carry digital data streams representing various types of information.

Network link 913 typically provides data communication through one or more networks to other network resources. For example, network link 914 may provide a connection through local network 915 to a host computer 916, or a network storage/server 917. Additionally or alternatively, the network link 913 may connect through gateway/firewall 917 to the wide-area or global network 918, such as an Internet. Thus, the computer platform 901 can access network resources located anywhere on the Internet 918, such as a remote network storage/server 919. On the other hand, the computer platform 901 may also be accessed by clients located anywhere on the local area network 915 and/or the Internet 918. The network clients 920 and 921 may themselves be implemented based on the computer platform similar to the platform 901.

Local network 915 and the Internet 918 both use electrical, electromagnetic or optical signals that carry digital data streams. The signals through the various networks and the signals on network link 914 and through communication interface 913, which carry the digital data to and from computer platform 901, are exemplary forms of carrier waves transporting the information.

Computer platform 901 can send messages and receive data, including program code, through the variety of network(s) including Internet 918 and LAN 915, network link 914 and communication interface 913. In the Internet example, when the system 901 acts as a network server, it might transmit a requested code or data for an application program running on client(s) 920 and/or 921 through Internet 918, gateway/firewall 917, local area network 915 and communication interface 913. Similarly, it may receive code from other network resources.

The received code may be executed by processor 905 as it is received, and/or stored in persistent or volatile storage devices 908 and 906, respectively, or other non-volatile storage for later execution. In this manner, computer system 901 may obtain application code in the form of a carrier wave.

It should be noted that the present invention is not limited to any specific firewall system. The inventive policy-based content processing system may be used in any of the three firewall operating modes and specifically NAT, routed and transparent.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized system for image orientation classification. It is intended that the specification and examples be considered as exemplary only, with a true scope and spirit of the invention being indicated by the following claims.

What is claimed is:

1. A method for determining an optimal image orientation, the method comprising:
    a. obtaining an input image;
    b. extracting image features for the input image;
    c. generating rotated image features corresponding to alternate orientation of the image;
    d. analyzing the extracted and generated features using a plurality search trees constructed from large sets of images of known orientation, the plurality of search trees comprising candidate nearest neighbors;
    e. combining orientations of the candidate nearest neighbors using a weighted vote; and
    f. determining the optimal image orientation of the input image using a result of e.

2. The method of claim 1, wherein analyzing using the plurality search trees further comprises using kd-trees to index the extracted image features from training data of known orientation based on spatial blocks, feature dimension, or a combination or projection of the spatial blocks and the feature dimension.

3. The method of claim 1, further comprising performing a decomposition on the extracted image features.

4. The method of claim 1, wherein the extracted image features comprise edge orientation histograms.

5. The method of claim 1, wherein the edge orientation histograms are generated using a uniform spatial grid.

6. The method of claim 5, wherein the edge orientation histograms are produced, in each spatial grid element, by quantizing edges into equally split bins.

7. The method of claim 1, further comprising computing color moment features.

8. The method of claim 1, further comprising normalizing the extracted image features.

9. The method of claim 1, wherein the rotated image features are generated using block permutation and edge orientation rotation.

10. The method of claim 1, wherein the plurality of search trees is generated using a training set of images of known orientation.

11. A non-transitory computer readable medium embodying a set of instructions, the set of instructions, when executed by one or more processors, is operable to cause the one or more processors to perform a method for determining an optimal image orientation, the method comprising:
    a. obtaining an input image;
    b. extracting image features for the input image;
    c. generating rotated image features corresponding to alternate orientation of the image;
    d. analyzing the extracted and generated features using a plurality search trees constructed from large sets of images of known orientation, the plurality of search trees comprising candidate nearest neighbors;
    e. combining orientations of the candidate nearest neighbors using a weighted vote; and
    f. determining the optimal image orientation of the input image using a result of e.

12. The non-transitory computer readable medium of claim 11, wherein constructing search trees further comprises using kd-trees to index the extracted image features from training data of known orientation based on spatial blocks, feature dimension, or a combination or projection of the spatial blocks and the feature dimension.

13. The non-transitory computer readable medium of claim 11, further comprising performing a decomposition on the extracted image features.

14. The non-transitory computer readable medium of claim 11 wherein the extracted image features comprise edge orientation histograms.

15. The non-transitory computer readable medium of claim 11, wherein the edge orientation histograms are generated using a uniform 5×5 spatial grid.

16. The non-transitory computer readable medium of claim 15, wherein the edge orientation histograms are produced, in each spatial grid, by quantizing edges into equally split bins.

17. The non-transitory computer readable medium of claim 11, further comprising computing color moment features.

18. The non-transitory computer readable medium of claim 11, further comprising normalizing the extracted image features.

19. The non-transitory computer readable medium of claim 11, wherein the rotated image features are generated using block permutation and edge orientation rotation.

20. The non-transitory computer readable medium of claim 11, wherein the plurality of search trees is generated using a training set of images of known orientation.

21. A system for determining an optimal image orientation, the system comprising a processor and a non-volatile memory configured to store executable instructions, including:
    a. an input module operable to obtain an input image;
    b. an image feature extracting module operable to extract image features for the input image;
    c. a rotated image features generation module operable to generate rotated image features corresponding to alternate orientation of the image;
    d. a search tree module operable to analyze the extracted and generated features using a plurality search trees constructed from large sets of images of known orientation, the plurality of search trees comprising candidate nearest neighbors; and e. a combining module operable to combine orientations of the candidate nearest neighbors using a weighted vote; wherein the optimal image orientation of the input image is determined based on a result of the combining.

22. The system of claim 21, wherein constructing search trees further comprises using kd-trees to index the extracted image features from training data of known orientation based on spatial blocks, feature dimension, or a combination or projection of the spatial blocks and the feature dimension.

* * * * *